United States Patent [19]

Shirtum et al.

[11] Patent Number: 4,877,857

[45] Date of Patent: Oct. 31, 1989

[54] PREPARATION OF EPOXY RESINS

[75] Inventors: Robert P. Shirtum, Freeport; Elaine B. Darby, San Antonio, both of Tex.

[73] Assignee: The Dow Chemical Company, Midland, Mich.

[21] Appl. No.: 295,859

[22] Filed: Jan. 11, 1989

Related U.S. Application Data

[63] Continuation-in-part of Ser. No. 190,608, May 5, 1988, abandoned.

[51] Int. Cl.$^4$ .................. C08G 59/06; C08G 59/10; C08G 59/12

[52] U.S. Cl. .................................... 528/95; 525/507; 525/509; 528/87; 549/514; 549/515; 549/517

[58] Field of Search .................. 525/507, 509; 528/87, 528/95; 549/514, 515, 517

[56] References Cited

U.S. PATENT DOCUMENTS

| | | | |
|---|---|---|---|
| 2,848,435 | 8/1958 | Griffin et al. | 260/47 |
| 3,121,727 | 2/1964 | Baliker, Jr. et al. | 260/348.6 |
| 3,372,142 | 3/1968 | Smith | 528/95 X |
| 3,766,221 | 10/1973 | Becker | 549/517 |
| 3,825,522 | 7/1974 | Vargiu et al. | 260/47 EP |
| 4,017,523 | 4/1977 | Vargiu et al. | 260/348.6 |
| 4,132,718 | 1/1979 | Vargiu et al. | 260/348.15 |
| 4,447,598 | 5/1984 | Caskey et al. | 528/489 |
| 4,483,888 | 11/1984 | Wu | 528/483 X |
| 4,499,255 | 2/1985 | Wang et al. | 528/95 |
| 4,558,116 | 12/1985 | Wernli et al. | 528/95 |
| 4,751,280 | 1/1988 | Pham et al. | 528/95 |
| 4,778,863 | 10/1988 | Wang et al. | 549/517 |

FOREIGN PATENT DOCUMENTS

| | | |
|---|---|---|
| 173297 | 7/1978 | Czechoslovakia . |
| 2056033 | 6/1971 | Fed. Rep. of Germany . |
| 224040 | 6/1985 | Fed. Rep. of Germany . |
| 59-209644 | 11/1984 | Japan . |
| 60-81176 | 5/1985 | Japan . |

*Primary Examiner*—Earl Nielsen

[57] ABSTRACT

The construction costs of a process for preparing epoxy compounds from aromatic compounds containing an active hydrogen atom reactive with an epihalohydrin by reacting such compounds with an epihalohydrin in the presence of an alkali metal hydroxide while controlling the water content in the reaction mixture and subsequently removing the alkali metal halide salt from the reaction mixture is made less costly by employing a water extraction means to remove the alkali metal halide salts from the reaction product mixture containing the epoxy product.

24 Claims, No Drawings

PREPARATION OF EPOXY RESINS

CROSS REFERENCE TO RELATED APPLICATION

This application is a continuation-in-part of application Ser. No. 190,608 filed May 5, 1988, now abandoned.

BACKGROUND OF THE INVENTION

The present invention pertains to the preparation of glycidyl derivatives of aromatic compounds containing an active hydrogen atom reactive with an epihalohydrin.

The preparation of glycidyl ethers by the reaction of an aromatic hydroxyl-containing compound with epihalohydrin in the presence of a base is well known as disclosed by Lee and Neville in HANDBOOK OF EPOXY RESINS, McGraw-Hill, 1967.

Improvements in the process for the preparation of epoxy resins have been made by Vargiu et al. in U.S. Pat. No. 4,017,523 who prepared epoxy resins having low hydrolyzable chloride by removing the excess epihalohydrin from the preparation of the halohydrin intermediate product and dissolving it in a solvent prior to dehydrohalogenation. Caskey et al. in U.S. Pat. No. 4,447,598 prepared epoxy resins low in hydrolyzable chloride contents by employing a second dehydrohalogenation step. Wang et al. prepared epoxy resins by reacting the phenolic hydroxyl-containing compound with an epihalohydrin in the presence of an alkali metal hydroxide and a solvent which codistills with water and epihalohydrin.

The preparation of an epoxy resin by these methods generates large quantities of alkali metal halide salts which must be removed from the resin or vice versa. The solid salt formed during the reaction is usually removed by mechanical means such as filtration or centrifugation. This is relatively expensive equipment to purchase in order to manufacture these epoxy resins on a commercial scale. It would therefore be desirable to have a method for the preparation of these epoxy resins which did not require the use of the mechanical equipment for removing the salt from the epoxy resin or for removing the epoxy resin from the salt.

SUMMARY OF THE INVENTION

The present invention pertains to an improvement in a process for the preparation of epoxy resins which comprises reacting a molar excess of at least one epihalohydrin with at least one aromatic compound containing an active hydrogen atom reactive with an epihalohydrin in the presence of an organic solvent or mixture of organic solvents, and an alkali metal hydroxide while controlling the concentration of water in the reaction mixture; wherein the improvement resides in (1) after completion of the reaction, conducting one of the following
   (a) cooling the reaction mixture to a temperature of not greater than about 30° C. followed by neutralization of the reaction mixture with carbon dioxide or weak inorganic acid in a quantity such that the reaction mixture has a pH of from about 7 to about 10;
   (b) neutralizing the reaction mixture with carbon dioxide or weak inorganic acid in a quantity such that the reaction mixture has a pH of from about 7 to about 10 followed by cooling the reaction mixture to a temperature of not greater than about 30° C.; or
   (c) simultaneously neutralizing the reaction mixture with carbon dioxide or weak inorganic acid in a quantity such that the reaction mixture has a pH of from about 7 to about 10 and cooling the reaction mixture to a temperature of not greater than about 30° C.;
(2) adding a sufficient quantity of water to form an aqueous layer and an organic layer;
(3) separating the organic layer from the aqueous layer;
(4) subjecting the organic layer to multiple washings with water; and
(5) recovering the epoxy resin from the resultant organic solution containing epihalohydrin, organic solvent and epoxy resin.

Another aspect of the present invention pertains to a process for the preparation of epoxy resins which process comprises (A) continuously or incrementally adding an aqueous alkali metal hydroxide solution over a period of from about 0.5 to about 20, suitably from about 1 to about 10, more suitably from about 1 to about 6, most suitably from about 1.5 to about 3 hours to a mixture containing (1) at least one aromatic compound containing at least one active hydrogen atom reactive with an epihalohydrin, (2) at least a molar excess of at least one epihalohydrin and (3) at least one organic solvent which codistills with water and epihalohydrin at a temperature below the boiling point of the lowest boiling compound among the components in the reaction mixture at the pressure employed or at least one organic solvent which has a boiling point above the temperature at which epihalohydrin and water codistill at the temperature and pressure employed or a combination of such solvents;
(B) conducting the reaction under a reduced pressure sufficient to provide a distillate with a boiling point of from about 35° C. to about 90° C. while continuously removing water by means of codistillation with epihalohydrin and solvent at a rate such that the water content in the eaction mixture is less than about 6 percent by weight;
(C) separating the water from the distillate and returning the epihalohydrin and organic solvent to the reaction mixture;
(D) drying the reaction mixture at conditions which do not remove substantial quantities of unreacted epihalohydrin until the concentration of water is equal to or less than about 2 percent by weight;
(E) after drying, conducting one of the following
   (1) cooling the reaction mixture to a temperature of not greater than about 30° C. followed by neutralization of the reaction mixture with carbon dioxide or weak inorganic acid in a quantity such that the reaction mixture has a pH of from about 7 to about 10;
   (2) neutralizing the reaction mixture with carbon dioxide or weak inorganic acid in a quantity such that the reaction mixture has a pH of from about 7 to about 10 followed by cooling the reaction mixture to a temperature of not greater than about 30° C.; or
   (3) simultaneously neutralizing the reaction mixtur with carbon dioxide or weak inorganic acid in a quantity such that the reaction mixture has a pH of from about 7 to about 10 and cooling the reaction mixture to a temperature of not greater than about 30° C.;

(F) adding a sufficient amount of water so as to form an aqueous layer containing dissolved alkali metal halide and an organic layer containing epoxy resin-/epihalohydrin/organic solvent;

(G) separating the organic and aqueous layers and subjecting the organic layer to multiple washings with water; and (H) recovering the resultant epoxy resin from the water washed organic layer containing resin-/epihalohydrin/organic solvent mixture by any suitable means.

Another aspect of the present invention pertains to removal of organic compounds from the aqueous phases and water wash streams resulting in the above processes by contacting them, either separately or in combination, with epihalohydrin and subjecting the resultant epihalohydrin wash stream to distillation to remove water and organic compounds therefrom.

The present invention provides a process for producing epoxy resins via a process which does not require solids separation equipment to separate the alkali metal halide from the reaction mixture.

DETAILED DESCRIPTION OF THE INVENTION

The epihalohydrin can be employed in an amount of at least about 1, suitably from about 2 to about 20, more suitably from about 4 to about 12, most suitably from about 6 to about 10, molar excess of epihalohydrin above that required to react stoichiometrically with the active hydrogen-containing material.

The aqueous alkali metal hydroxide solution is employed in a concentration of from about 10 to about 60, suitably from about 20 to about 55, more suitably from about 30 to about 55, most suitably from about 40 to about 50, percent alkali metal hydroxide by weight.

The reaction is conducted under reduced pressure so as to form a co-distillate of water, epihalohydrin and the organic solvent at the desired reaction temperature.

The reaction is conducted at a temperature of from about 35° C. to about 90° C., suitably from about 40° C. to about 85° C., more suitably from about 45° C. to about 75° C., most suitably from about 50° C. to about 70° C., while continuously removing water by means of codistillation with epihalohydrin and solvent at a rate such that the water content in the reaction mixture is less than about 6, suitably from about 0.1 to about 4, more suitably from about 0.2 to about 2, most suitably from about 0.2 to about 0.5 percent by weight.

If the reaction is conducted at temperatures below about 35° C., the time required to complete the reaction becomes excessive and it becomes difficult to condense and manage the distillate in a manner conducive to optimum reaction composition.

If the reaction is conducted at temperatures above about 90° C., large amounts of insoluble polymers are formed, raw material yields are lowered and processing difficulties occur.

Water is removed during the reaction such that its concentration in the reaction mixture is less than about 6, suitably from about 0.3 to about 5, more suitably from about 0.5 to about 4, most suitably from about 0.8 to about 2 percent by weight.

If the reaction is conducted such that the concentration of water in the reaction mixture exceeds about 6 percent by weight, hydrolysis of the epihalohydrin becomes dominant and a product very high in hydrolyzable halide is obtained and epihalohydrin yields are decreased.

Upon completion of the reaction, the reaction mixture is optionally dried such that the water concentration therein is less than about 2, suitably equal to or less than about 1.5, more suitably equal to or less than about 1, most suitably equal to or less than about 0.2 percent by weight.

Likewise, if the reaction mixture is not dried prior to neutralization and cooling, the hydrolyzable halide content of the finished resin is substantially higher than that which is obtained when the reaction mixture is dried prior to neutralization and cooling. Likewise, the lower the amount of water in the resultant product mixture, the lower the amount of hydrolyzable halide content in the final recovered epoxy product. For non-electrical applications, the epoxy products do not require unusually low hydrolyzable halide contents.

Suitable weak inorganic acids which can be employed herein include, any such acid which does not substantially react with the epoxide groups under the conditions at which the acid is added. Inorganic acids having a pK value of from about 2 to about 5 are particularly suitable. Most partcularly suitable such acids include, for exaple, $H_2CO_3$, $NaH_2PO_4$, $NaHCO_3$, $KHCO_3$, $KH_2PO_4$, $Na_2HPO_4$, $K_2HPO_4$ and combinations thereof.

Carbon dioxide can also be employed in as much as it forms $H_2CO_3$ due to the water present. When carbon dioxide is employed, it can be employed in either the solid, liquid or gaseous state, preferably the liquid or gaseous state.

The carbon dioxide or weak inorganic acid is employed in an amount sufficient to cause the pH of the reaction mixture to be suitably from about 7 to about 10, more suitably from about 8 to about 10, most suitably from about 8 to about 9. If the pH is lowered to below about 7, unnecessary quantities of carbon dioxide would be employed amounting to a waste of raw materials and an unnecessary increase in production costs. If the pH is above about 10, the resultant epoxy resin will react to advance in molecular weight and increase in viscosity during the remaining stages of the process. Further, yield losses to epihalohydrin hydrolysis products will result thus further consuming an unnecessary amount of raw materials and creating waste disposal problems. In addition, epichlorohydrin polymers will be formed which are very difficult to remove from the product resins.

If desired, the cooling and neutralization with weak inorganic acid, especially when carbon dioxide is employed as the neutralization agent, can be conducted simultaneously.

If desired, the water washing can be done continuously via counter current multi-stage extraction or in multiple single-stage steps. The water can contain very minor amounts of organic and or inorganic compounds including, but not limited to epihalohydrin, halohydrin intermediates, epoxy resin, alkali metal halides, solvent and the like. The water employed from washing usually does not contain more than about 8, more usually not more than about 5, most usually not more than about 3, percent of the organic and/or inorganic compounds by weight.

The removal of the organic compounds from the aqueous phases and water wash streams can be conducted at temperatures suitably from about 15° C. to about 40° C., more suitably from about 20° C. to about 35° C., most suitably from about 25° C. to about 30° C. After this treatment, the resultant epihalohydrin can be recycled in the process.

Suitable compounds which can be employed to react with the epihalohydrin to prepare the corresponding epoxy compounds include, for example, phenols, bisphenols, novolac resins, polyvinyl phenols, the corresponding amine-containing and carboxyl-containing materials. Suitable such materials include but are not limited by those represented by the following formulas I, II, III, IV or V:

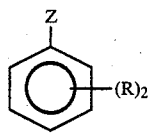

Formula I.

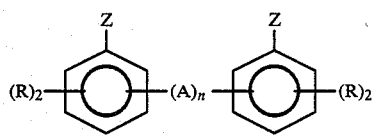

Formula II.

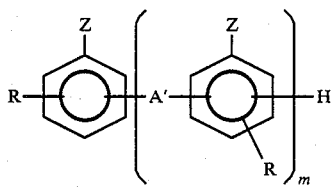

Formula III.

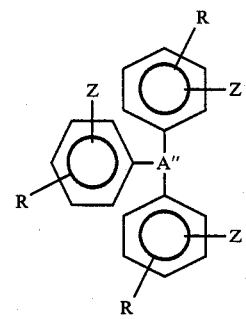

Formula IV.

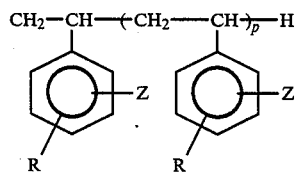

Formula V.

wherein each A is independently a divalent hydrocarbon group having from 1 to about 12, preferably from 1 to about 6 carbon atoms, —O—, —S—, —S—S—, —SO—, —SO$_2$— or —CO—; A' is a divalent hydrocarbon group having from 1 to about 6, preferably from 1 to about 4, carbon atoms; A" is a trivalent hydrocarbon group having from 1 to about 12, preferably from 1 to about 6, carbon atoms each R is independently hydrogen, a hydrocarbyl group having from 1 to about 10, preferably from 1 to about 4, carbon atoms, a halogen atom, preferably chlorine or bromine or a hydroxyl group or an amino group; each Z is independently —OH, —NH$_2$ or —COOH; p has a value of from about 1 to about 100, preferably from about 2 to about 50; m has a value from about 1.00 to about 6 and n has a value of zero or 1.

Also suitable as compounds having at least one aromatic hydroxyl, aromatic amine or carboxyl group per molecule are those represented by the following formulas VI, VII or VIII

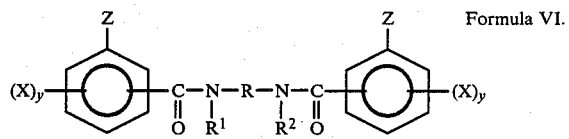

Formula VI.

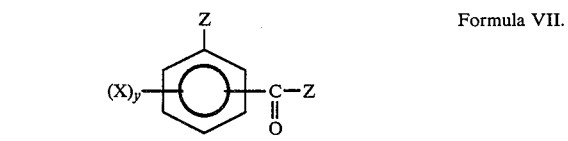

Formula VII.

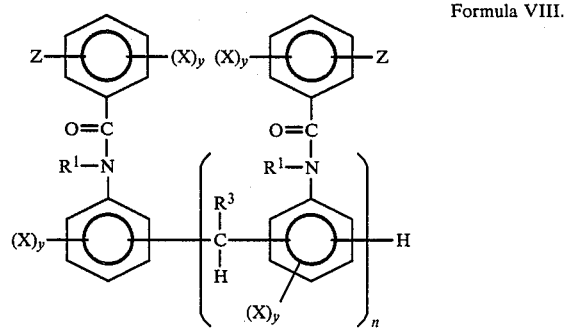

Formula VIII.

wherein each R is a divalent hydrocarbyl group having from 1 to about 18, preferably from about 2 to about 12 and most preferably from about 2 to about 6 carbon atoms, a group represented by the following formulas IX, X, XI or XII

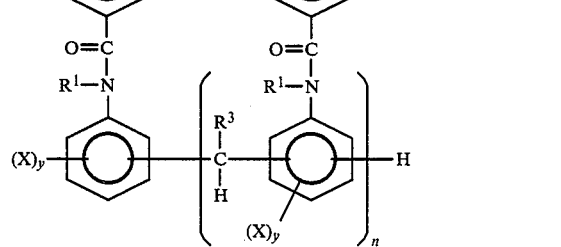

Formula IX.

Formula X.

Formula XI.

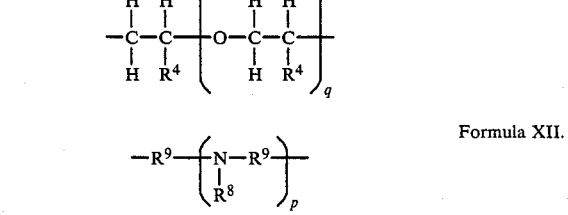

Formula XII.

or R can combine with R$^1$ so as to form a stable heterocyclic ring with the nitrogen atoms; each A is independently a divalent hydrocarbyl group having from 1 to about 10, preferably from 1 to about four carbon atoms, —O—, —S—, —S—S—, —CO—, —SO—, or —SO$_2$—; each $R^1$ is independently hydrogen, a 2,3-epoxypropyl group, a 2-alkyl-2,3-epoxypropyl group, a monovalent hydrocarbyl group or a hydroxyl substituted monovalent hydrocarbyl group, said hydrocarbyl groups having from 1 to about 9 carbon atoms, said alkyl having from 1 to about 4, preferably 1 to abiut 3 carbon atoms; each $R^2$ is independently hydrogen or an alkyl group having from 1 to about 4, preferably 1 to about 3 carbon atoms; each $R^3$ is independently hydrogen or an alkyl group having from 1 to about 4 carbon atoms; each $R^4$ is independently hydrogen, a hydrocarbyl or halogen substituted hydrocarbyl group having from 1 to about 9, preferably from 1 to about 2 carbon atoms; each $R^8$ is independently selected from the same groups as $R^1$ except that $R^8$ cannot be a hydrogen; each $R^9$ is independently a divalent hydrocarbyl group having from 2 to 4, preferably 2 carbon atoms; each Z is independently —OH, —NH or —COOH; each X is independently hydrogen, chlorine, bromine or a hydrocarbyl or a hydrocarbyloxy group having from 1 to about 9, preferably 1 to about 6 carbon atoms; each m independently has a value of zero or 1; n has an average value of from about 0.01 to about 6, preferably 0.1 to about 4; p has an average value of from 1 to about 10, preferably from 1 to about 3; q has an average value of at least 1, preferably from 1 to about 150, most preferably from 1 to about 100 and usually from 1 to about 10 and each y and z independently has a value of 1 or 2.

Also suitable are polycyclopentadiene polyphenols or aromatic polyamines represented by the following formula XIII

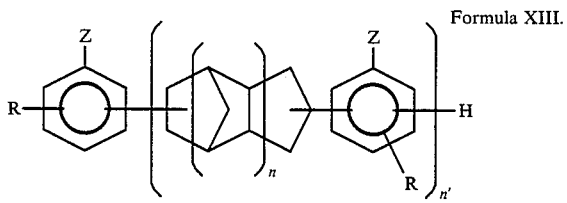

Formula XIII.

wherein Z is —OH, —NH or —COOH; n has a value from 1 to about 5; n' has a value of from about 1 to about 10, preferably from 3 to about 6; each R is independently hydrogen, a hydrocarbyl group having from 1 to about 10, preferably from 1 to about 4 carbon atoms, a halogen atom, preferably chlorine or bromine, or a hydroxyl group or an amino group.

Suitable such polycyclopentadiene polyphenols and methods for their preparation can be found in U.S. Pat. No. 4,390,680 issued to Donald L. Nelson on June 28, 1983 which is incorporated herein by reference. The polycyclopentadiene aromatic polyamines can be prepared in a similar manner by substituting an aromatic amine for the phenolic compound.

Also suitable are compounds containing both at least one aromatic hydroxyl group and at least one aromatic amine group such as, for example, hydroxyl aniline, aminoxylenol and the like.

The term hydrocarbyl as employed herein means any aliphatic, cycloaliphatic, aromatic, aryl substituted aliphatic or cycloaliphatic, or aliphatic or cycloaliphatic substituted aromatic groups. The aliphatic groups can be saturated or unsaturated.

Suitable epihalohydrins which can be employed herein include those represented by the following formula

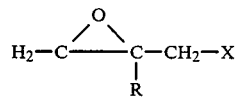

wherein R is hydrogen or a hydrocarbyl group having from 1 to about 4 carbon atoms and X is a halogen, preferably chlorine or bromine.

Particularly suitable epihalohydrins include, for example, epichlorohydrin, epibromohydrin, epiiodohydrin, methylepichlorohydrin, methylepibromohydrin, methylepiiodohydrin, combinations thereof and the like.

Suitable alkali metal hydroxides which can be employed herein include, for example, sodium hydroxide, potassium hydroxide, lithium hydroxide or mixtures thereof. The alkali metal hydroxide is employed as an aqueous solution, usually at a concentration of from about 20 to about 60, suitably from about 20 to about 55, more suitably from about 30 to about 55, most suitably from about 40 to about 50 percent by weight.

The amount of alkali metal hydroxide which can be employed in the process of the present invention is from about 0.80 mole to about 1.2 mole of alkali metal hydroxide, preferably from about 0.90 mole to 1.0 mole per each aromatic hydroxyl group, aromatic amine hydrogen or —COOH group.

The alkali metal hydroxide can be added either continuously or incrementally, but never is all of the alkali metal hydroxide added in one increment.

Suitable solvents which can be employed herein include any solvent which does not appreciably react with any component in the reaction mixture, is partially or wholly miscible with water, forms a codistillate with the epihalohydrin and water and the distillate has a boiling point below that of the lowest boiling component of the reaction mixture at the pressure employed or an organic solvent which has a boiling point above the boiling point of any codistillate formed by water and epihalohydrin at the reaction temperature and pressure. Suitable such solvents include primary and secondary alcohols such as, for example, 1-methoxy-2-hydroxy propane, 1-butoxy-2-hydroxy ethane, cyclohexanol, and the like. The secondary alcohols are preferred.

The amount of solvent which can be employed will depend on the particular solvent and hydroxyl or amino compound being employed. The solvent generally ranges from about 5 to about 50 weight percent, suitably from about 10 to about 40, more suitably from about 10 to about 30, most suitably from about 10 to about 25, weight percent based on the total weight of reactants.

The following examples are illustrative of the invention, but are not to be construed as to limiting the scope thereof in any manner.

EXAMPLE 1

Bisphenol A, 228.3 gms (1 mole), epichlorohydrin, 833.6 gms (9 moles), and propylene glycol methyl ether, 92.6 gms (10 weight % in epichlorohydrin) are stirred under atmospheric conditions to completely dissolve the bisphenol into solution. The solution is then heated to 65° C. at a reduced pressure of 150 mmHg. Aqueous sodium hydroxide (50% conc. by wt., 156.8 gms, 0.98 equivalent) is added to the reaction mixture at a constant rate over a period of two hours. During the addition of the sodium hydroxide, the water, epichlorohydrin, and propylene glycol methyl ester form an azeotropic mixture, which is distilled through a packed tower section which is contacted counter-currently with condensed organic which has been condensed from the overhead vapors and separated into two distinct phases. The organic phase (bottom phase) is continuously returned to the reaction mixture through the packed tower section, while the aqueous phase (top phase) is removed. After the completion of caustic addition, the reaction mixture is further stirred at 65° C., 150 mmHg for an additional 15 minutes. This allows completion of the dehydrohalogenation reaction and further drying of the reaction medium to provide a stable reaction mixture. The reaction is then neutralized and cooled with approximately 15 gms of dry ice ($CO_2$). When the temperature in the reactor is 30° C., and the pH is 7, 487.5 gms of epichlorohydrin saturated deionized water is added to the reactor to dissolve the sodium chloride into a 24 weight % brine solution. This solution is mixed in the reactor until the salt dissolves. The brine is then allowed to settle and is decanted from the organic solution. The organic solution is washed with 135 gms deionized water saturated with epichlorohydrin by gentle agitation. The organic phase is decanted and filtered prior to flash distillation using a rotary evaporator. Final stripping conditions are 180° C., 50 mmHg. The resulting resin has, 100 ppm hydrolyzable chloride and 1200 ppm total chloride. The final epihalohydrin yield is greater than 98%.

The decanted brine solution is washed with epichlorohydrin to extract the resin and soluble propylene glycol methyl ether from the brine. A 5:1 weight ratio of brine to epichlorohydrin is used to extract the resin, six single stage washes achieved non-dectable resin concentrations and 1.0% propylene glycol methyl ether in the brine solution. The brine solution is then vacuum stripped in a rotary evaporator at 68° C., 155 mmHg to achieve less than 100 ppm epichlorohydrin and 100 ppm propylene glycol methyl ether in the final brine solution.

EXAMPLE 2

Bisphenol A, 228.3 gms (1 mole), epichlorohydrin, 833.6 gms (9 moles), and propylene glycol methyl ether, 92.6 gms (10 weight % in epichlorohydrin) are stirred under atmospheric conditions to completely dissolve the bisphenol into solution. The solution is then heated to 65° C. at a reduced pressure of 155 mmHg. Aqueous sodium hydroxide (50% conc. by wt., 156.8 gms, 0.98 equivalent) is added to the reaction mixture at a constant rate over a period of two hours. During the addition of the sodium hydroxide, the water, epichlorohydrin, and propylene glycol methyl ether form an azeotropic mixture, which is distilled through a packed tower section which is contacted counter-currently with condensed organic which has been condensed from the overhead vapors and separated into two distinct phases. The organic phase (bottom phase) is continuously returned to the reaction mixturee through the packed tower section, while the aqueous phase (top phase) is removed. After the completion of caustic addition, the reaction mixture is further stirred at 65° C., 155 mmHg for an additional 15 minutes. This allows completion of the dehydrohalogenation reaction and further drying of the reaction medium to provide a stable reaction mixture. The reaction is then neutralized and cooled with approximately 15 gms of dry ice ($CO_2$). When the temperature in the reactor is 30° C., and the pH is 7, 487.5 gms of epichlorohydrin saturated deionized water is added to the reactor to dissolve the sodium chloride into a 15 weight % brine solution. This solution is mixed in the reactor until the salt dissolves. The organic is then allowed to settle and is decanted from the brine solution. The organic solution is washed with 135 gms deionized water saturated with epichlorohydrin by gentle agitation. The organic phase is decanted and filtered prior to flash distillation using a rotary evaporator. Final stripping conditions are 180° C., 50 mmHg. The resulting resin has, 50 ppm hydrolyzable chloride.

The brine solution from which the organic solution has been decanted is washed with epichlorohydrin to extract the resin and soluble propylene glycol methyl ether from the brine. A 5:1 weight ratio of brine is epichlorohydrin is used to extract the resin, six single stage washes achieved non-dectable resin concentrations and 0.25% propylene glycol methyl ether in the brine solution. The brine solution is then vacuum stripped in a rotary evaporator at 68° C., 155 mmHg to achieve less than 100 ppm epichlorohydrin.

In like manner as in the preceeding examples, $H_2CO_3$, $NaH_2PO_4$, $NaHCO_3$, $KHCO_3$, $KH_2PO_4$, $Na_2HPO_4$, $K_2HPO_4$ or any combination thereof can be used in place of the carbon dioxide.

What is claimed is:

1. A process for the preparation of epoxy compounds which comprises reacting a molar excess of at least one epihalohydrin with at least one aromatic compound containing an active hydrogen atom reactive with an epihalohydrin in the presence of an organic solvent or mixture of organic solvents and an alkali metal hydroxide while controlling the concentration of water in the reaction mixture; the improvement which comprises
   (1) after completion of the reaction, conducting one of the following
      (a) cooling the reaction mixture to a temperature of not greater than about 30° C. followed by neutralization of the reaction mixture with carbon dioxide or weak inorganic acid in a quantity such that the reaction mixture has a pH of from about 7 to about 10;
      (b) neutralizing the reaction mixture with carbon dioxide or weak inorganic acid in a quantity such that the reaction mixture has a pH of from about 7 to about 10 followed by cooling the reaction mixture to a temperature of not greater than about 30° C.; or
      (c) simultaneously neutralizing the reaction mixture with carbon dioxide or weak inorganic acid in a quantity such that the reaction mixture has a pH of from about 7 to about 10 and cooling the reaction mixture to a temperature of not greater than about 30° C.;
   (2) adding a sufficient quantity of water to form an aqueous layer and an organic layer;
   (3) separating the organic layer and the aqueous layer;
   (4) subjecting the organic layer to multiple washings with water; and
   (5) recovering the epoxy resin from the resultant organic solution containing epihalohydrin, organic solvent and epoxy resin.

2. A process of claim 1 wherein in steps (1-a), (1-b) and (1-c) the pH is from about 8 to about 10 and said weak inorganic acid has a pK value of from about 2 to about 5.

3. A process of claim 1 wherein in steps (1-a), (1-b) and (1-c) the pH is from about 8 to about 9.

4. A process for the preparation of epoxy compounds which process comprises (A) continuously or incrementally adding an aqueous alkali metal hydroxide solution over a period of from about 0.5 to about 20, suitably from about 1 to about 10, more suitably from about 1 to about 6, most suitably from about 1.5 to about 3, hours to a mixture containing (1) at least one aromatic compound containing at least one active hydrogen atom reactive with an epihalohydrin, (2) at least a molar excess of at least one epihalohydrin and (3) at least one organic solvent which codistills with water and epihalohydrin at a temperature below the boiling point of the lowest boiling compound among the components in the reaction mixture at the pressure employed or at least one organic solvent which has a boiling point above the temperature at which epihalohydrin and water codistill at the temperature and pressure employed or a combination of such solvents;

(B) conducting the reaction under a reduced pressure sufficient to provide a distillate with a boiling point of from about 35° C. to about 90° C. while continuously removing water by means of codistillation with epihalohydrin and solvent at a rate such that the water content in the reaction mixture is less than about 6 percent by weight;

(C) separating the water from the distillate and returning the epihalohydrin and organic solvent to the reaction mixture;

(D) drying the reaction mixture at conditions which do not remove substantial quantities of unreacted epihalohydrin until the concentration of water is equal to or less than about 2 percent by weight;

(E) after drying, conducting one of the following (1) cooling the reaction mixture to a temperature of not greater than about 30° C. followed by neutralization of the reaction mixture with carbon dioxide or weak inorganic acid in a quantity such that the reaction mixture has a pH of from about 7 to about 10;

(2) neutralizing the reaction mixture with carbon dioxide or weak inorganic acid in a quantity such that the reaction mixture has a pH of from about 7 to about 10 followed by cooling the reaction mixture to a temperature of not greater than about 30° C.; or (3) simultaneously neutralizing the reaction mixture with carbon dioxide or carbon dioxide or weak inorganic acid in a quantity such that the reaction mixture has a pH of from about 7 to about 10 and cooling the reaction mixture to a temperature of not greater than about 30° C.;

(F) adding a sufficient amount of water so as to form an aqueous layer containing dissolved alkali metal halide and an organic layer containing epoxy resin-/epihalohydrin/organic solvent;

(G) separating the organic and aqueous layers and subjecting the organic layer to multiple washings with water; and (H) recovering the resultant epoxy resin from the water washed organic layer containing resin-/epihalohydrin/organic solvent mixture by any suitable means.

5. A process of claim 4 wherein (i) in step (A), the alkali metal hydroxide is added over a period of from about 1 to about 10 hours;

(ii) in step (B), the reaction is conducted under vacuum at a temperature of from about 40° C. to about 85° C. and the water is removed at a rate such that the water content in the reaction mixture is from about 0.1 to about 4;

(iii) in step (D), the water content is equal to or less than about 1.5 percent by weight; and (iv) in step (E), the pH value is from about 7 to about 10 and said inorganic acid has a pK value of from about 2 to about 2.5.

6. A process of claim 5 wherein (i) in step (A), the alkali metal hydroxide is added over a period of from about 1 to about 6 hours;

(ii) in step (B), the reaction is conducted at a temperature of from about 45° C. to about 75° C. and the water is removed at a rate such that the water content in the reaction mixture is from about 0.2 to about 2;

(iii) in step (D), the water content is equal to or less than about 1 percent by weight; and (iv) in step (E), the pH value is from about 8 to about 10 and said inorganic acid is selected from the group consisting of.

7. A process of claim 6 wherein (i) in step (A), the alkali metal hydroxide is added over a period of from about 1.5 to about 3 hours;

(ii) in step (B), the reaction is conducted under a vacuum at a temperature of from about 50° C. to about 70° C. and the water is removed at a rate such that the water content in the reaction mixture is from about 0.2 to about 0.5;

(iii) in step (D), the water content is equal to or less than about 0.2 percent by weight; and (iv) in step (E), the pH value is from about 8 to about 9.

8. A process of claim 1, 2 or 3 wherein the aqueous phases containing alkali metal halide and minor quantities of soluble organic compounds from steps 3 and 4 is extracted by contacting the aqueous phases, either separately or in combination, with an epihalohydrin; and subjecting the thus epihalohydrin washed product to distillation to remove water and organic materials therefrom.

9. A process of claims 4, 5, 6 or 7 wherein the aqueous phase and water was streams containing alkali metal halide and minor quantities of soluble organic compounds from step G is extracted by contacting the aqueous phase and water wash streams, either separately or in combination, with an epihalohydrin; and subjecting the thus epihalohydrin washed product to distillation to remove water and organic materials therefrom.

10. A process of claim 1, 2, 3, 4, 5, 6, or 7 wherein:

(i) said epihalohydrin is epichlorohydrin;

(ii) said alkali metal hydroxide is sodium hydroxide; and (iii) said compound containing an active hydrogen atom reactive with an epihalohydrin is a compound represented by the following formulas I, II, III, IV or V:

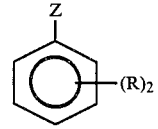

Formula I.

-continued

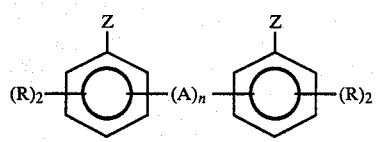
Formula II.

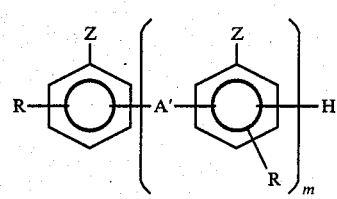
Formula III.

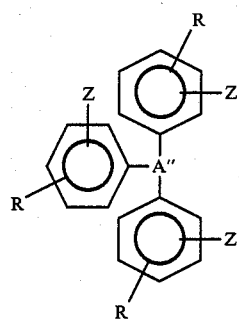
Formula IV.

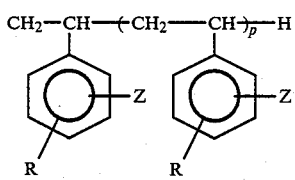
Formula V.

wherein each A is independently a divalent hydrocarbon group having from 1 to about 12 carbon atoms, —O—, —S—, —S—S—, —SO—, —SO$_2$— or —CO—; A' is a divalent hydrocarbon group having from 1 to about 6, preferably from 1 to about 4, carbon atoms; A" is a trivalent hydrocarbon group having from 1 to about 12 carbon atoms each R is independently hydrogen, a hydrocarbyl group having from 1 to about 10 carbon atoms, a halogen atom, a hydroxyl group or an amino group; each Z is independently —OH, —NH$_2$ or —COOH; p has a value of from about 1 to about 100; m has a value from about 1 to about 6 and n has a value of zero or 1.

11. A process of claim 10 wherein said compound containing an active hydrogen atom reactive with an epihalohydrin is bisphenol A, bisphenol F or bisphenol K.

12. A process of claim 8 wherein:
(i) said epihalohydrin is epichlorohydrin;
(ii) said alkali metal hydroxide is sodium hydroxide; and
(iii) said compound containing an active hydrogen atom reactive with an epihalohydrin is a compound represented by the following formulas I, II, III, IV or V:

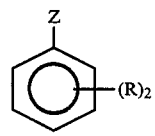
Formula I.

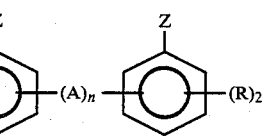
Formula II.

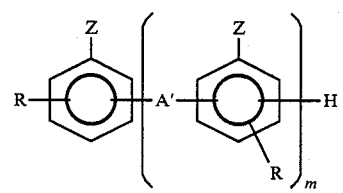
Formula III.

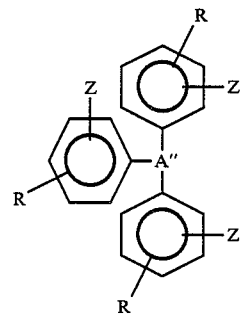
Formula IV.

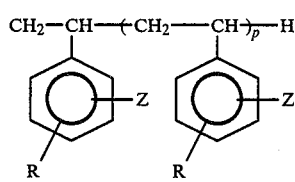
Formula V.

wherein each A is independently a divalent hydrocarbon group having from 1 to about 12 carbon atoms, —O—, —S—, —S—S—, —SO—, —SO$_2$— or —CO—; each A' is independently a divalent hydrocarbon group having from 1 to about 6, preferably from 1 to about 4, carbon atoms; A" is a trivalent hydrocarbon group having from 1 to about 12 carbon atoms each R is independently hydrogen, a hydrocarbyl group having from 1 to about 10 carbon atoms, a halogen atom, a hydroxyl group or an amino group; each Z is independently —OH, —NH$_2$ or —COOH; p has a value of from about 1 to about 100; m has a value from about 1 to about 6 and n has a value of zero or 1.

13. A process of claim 12 wherein said compound containing an active hydrogen atom reactive with an epihalohydrin is bisphenol A, bisphenol F or bisphenol K.

14. A process of claim 9 wherein:
(i) said epihalohydrin is epichlorohydrin;
(ii) said alkali metal hydroxide is sodium hydroxide; and
(iii) said compound containing an active hydrogen atom reactive with an epihalohydrin is a compound represented by the following formulas I, II, III, IV or V:

Formula I.

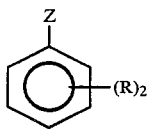

Formula II.

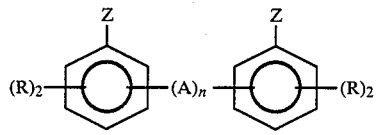

Formula III.

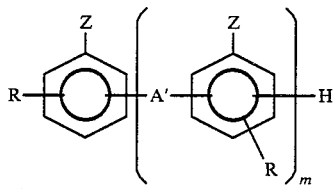

Formula IV.

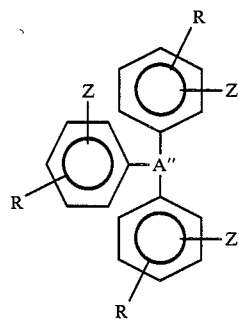

Formula V.

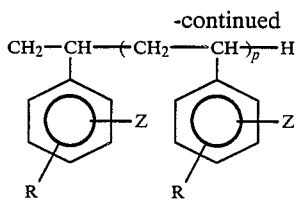

wherein each A is independently a divalent hydrocarbon group having from 1 to about 12 carbon atoms, —O—, —S—, —S—S—, —SO—, —SO$_2$— or —CO—; A' is a divalent hydrocarbon group having from 1 to about 6, preferably from 1 to about 4, carbon atoms; A" is a trivalent hydrocarbon group having from 1 to about 12 carbon atoms each R is independently hydrogen, a hydrocarbyl group having from 1 to about 10 carbon atoms, a halogen atom, a hydroxyl group or an amino group; each Z is independently —OH, —NH$_2$ or —COOH; p has a value of from about 1 to about 100; m has a value from about 1 to about 6 and n has a value of zero or 1.

15. A process of claim 14 wherein said compound containing an active hydrogen atom reactive with an epihalohydrin is bisphenol A, bisphenol F or bisphenol K.

16. A process of claim 1, 2, 3, 4, 5, 6 or 7 wherein neutralization is conducted with carbon dioxide.

17. A process of claim 8 wherein neutralization is conducted with carbon dioxide.

18. A process of claim 9 wherein neutralization is conducted with carbon dioxide.

19. A process of claim 10 wherein neutralization is conducted with carbon dioxide.

20. A process of claim 11 wherein neutralization is conducted with carbon dioxide.

21. A process of claim 12 wherein neutralization is conducted with carbon dioxide.

22. A process of claim 13 wherein neutralization is conducted with carbon dioxide.

23. A process of claim 14 wherein neutralization is conducted with carbon dioxide.

24. A process of claim 15 wherein neutralization is conducted with carbon dioxide.

* * * * *